CONTROL OF MANUAL BLOCK SIGNAL BY A MULTIPLE FREQUENCY CARRIER SYSTEM

Filed March 29, 1952 4 Sheets-Sheet 1

| SIGNAL "A5" | | SIGNAL "B5" | |
|---|---|---|---|
| ASPECT | CODE RATE | ASPECT | CODE RATE |
| R | 75 | R<br>Y<br>G | 120<br>180<br>270 |
| Y | 120 | R<br>Y<br>G | 75<br>180<br>270 |
| G | 270<br>270<br>180 | R<br>Y<br>G | 75<br>120<br>270 |

INVENTORS
F. X. REES, F. W. BRIXNER
AND W. M. BARKER
BY Neil D. Preston,
THEIR ATTORNEY INVENTORS
F. X. REES, F. W. BRIXNER
AND W. M. BARKER
BY *Neil D. Preston*
THEIR ATTORNEY INVENTORS
F.X.REES, F.W.BRIXNER
AND W.M.BARKER
BY
Neil D. Preston,
THEIR ATTORNEY INVENTORS
F.X. REES, F.W. BRIXNER
AND W.M. BARKER
BY *Neil L. Preston*,
THEIR ATTORNEY.

United States Patent Office 2,816,218

Patented Dec. 10, 1957

2,816,218

CONTROL OF MANUAL BLOCK SIGNAL BY A MULTIPLE FREQUENCY CARRIER SYSTEM

Frank X. Rees, Chili, Frederick W. Brixner, Gates, and William M. Barker, Scottsville, N. Y., assignors to General Railway Signal Company, Rochester, N. Y.

Application March 29, 1952, Serial No. 279,332

10 Claims. (Cl. 246—5)

Figures 1, 3:
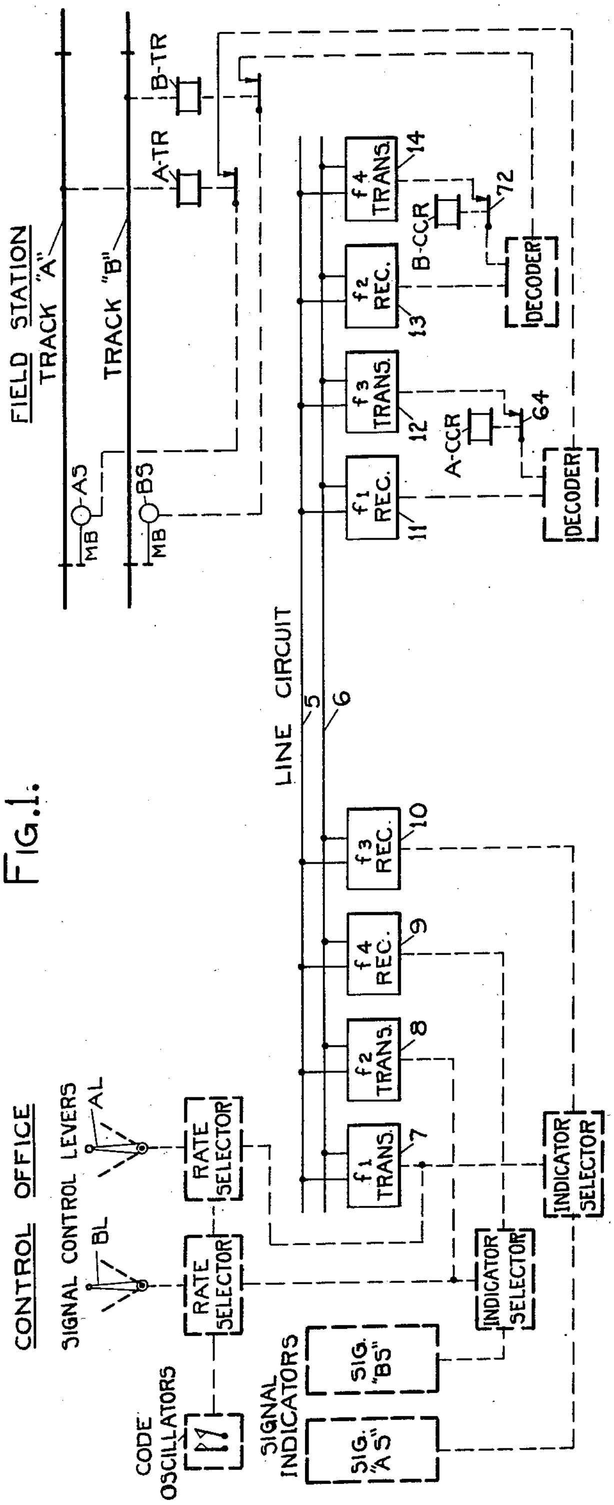

This invention relates to the control of railway signalling devices by carrier currents, and more particularly pertains to the remote control of manual block signals by a plurality of carrier frequencies over the same conducting medium.

In the control of railway signalling devices, it is most desirable to arrange the control so that no unsafe condition occurs upon the failure of the apparatus. However, when a plurality of different carrier currents are transmitted over the same conducting medium, it may happen that so called "cross-talk" or "cross-fire" will occur between the different carrier frequencies in the event of certain apparatus failures. The present invention proposes to so organize such a system that no control will result in the event of a so called "cross-talk" condition.

Generally speaking, and without attempting to define the exact nature and scope of the present invention, it is proposed to provide control of two remotely located manual block signals, each by a separate carrier current frequency, by coding their respective carrier frequencies at different rates in accordance with the particular control to be exercised upon the corresponding manual block signal.

In accordance with the present invention, the possibility of the "cross-talk" or "cross-fire" type of failure is obviated by reason of the fact that the code rates for the different manual block signals are selected dependent upon each other, so that the presence of the same code rate on both carrier frequencies is ineffective to accomplish any control whatsoever.

Another feature of the invention is to provide that the indication of each signal be transmitted back to the control office by a repeat code on a different carrier frequency for that signal, which repeat code must correspond in rate with the control code being transmitted from the control office to that signal. In order to provide that such an indication of each signal may be given at all times, a normal control code is transmitted to it even while the signals are held at stop.

Other objects, purposes and characteristic features of the present invention will be in part obvious from the accompanying drawings, and in part pointed out as the description progresses.

Figure 2A:
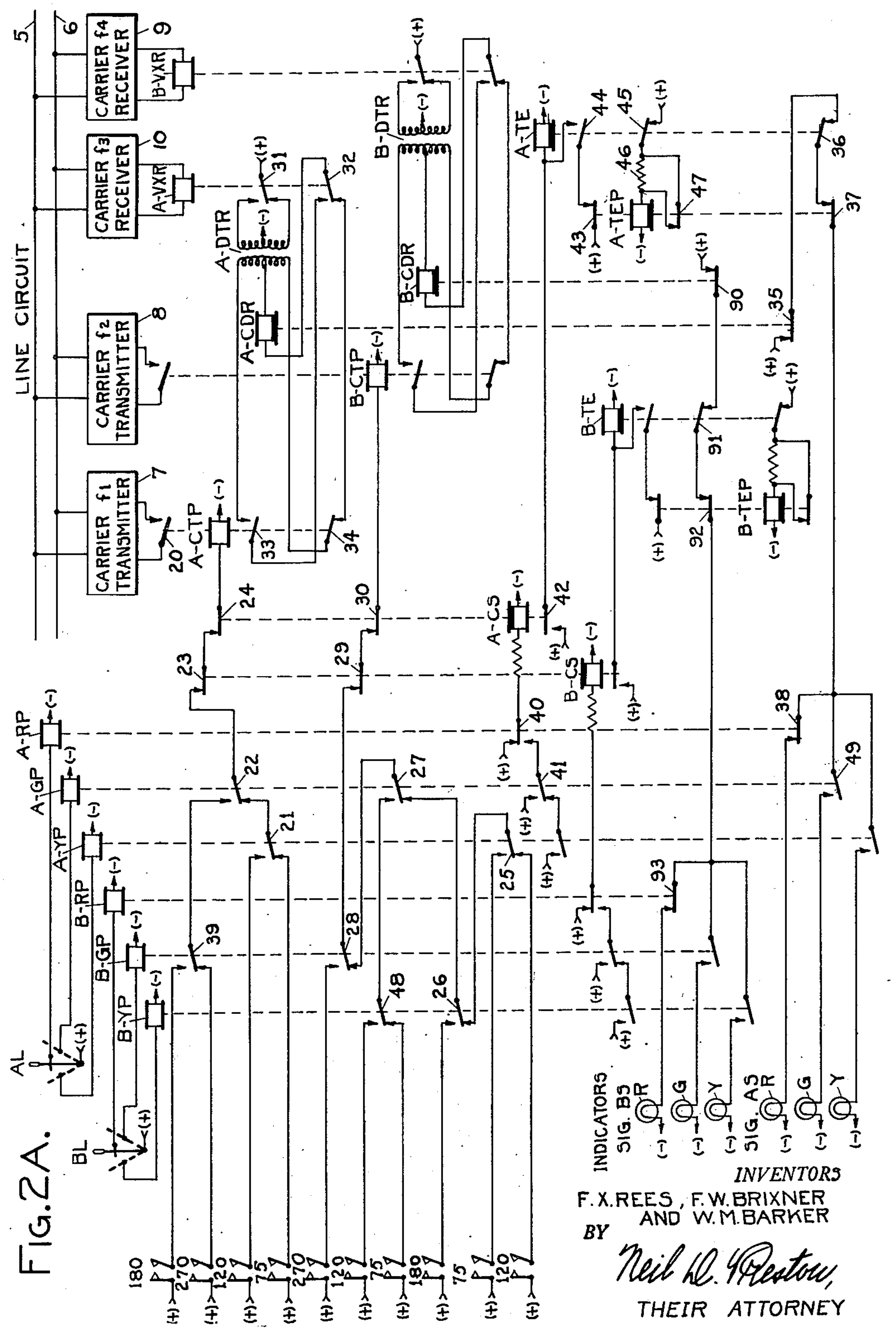
Figure 2B:
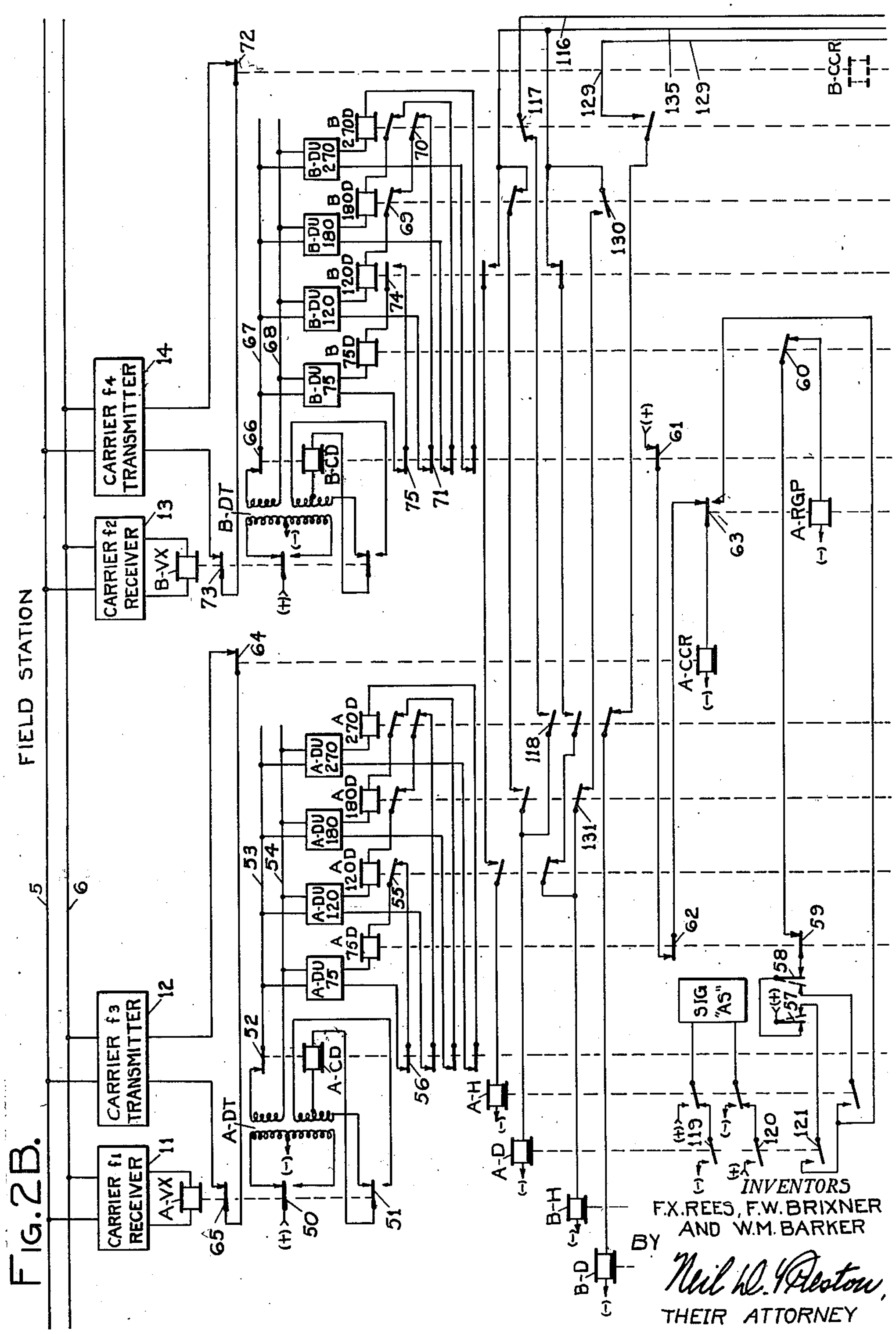
Figure 2C:
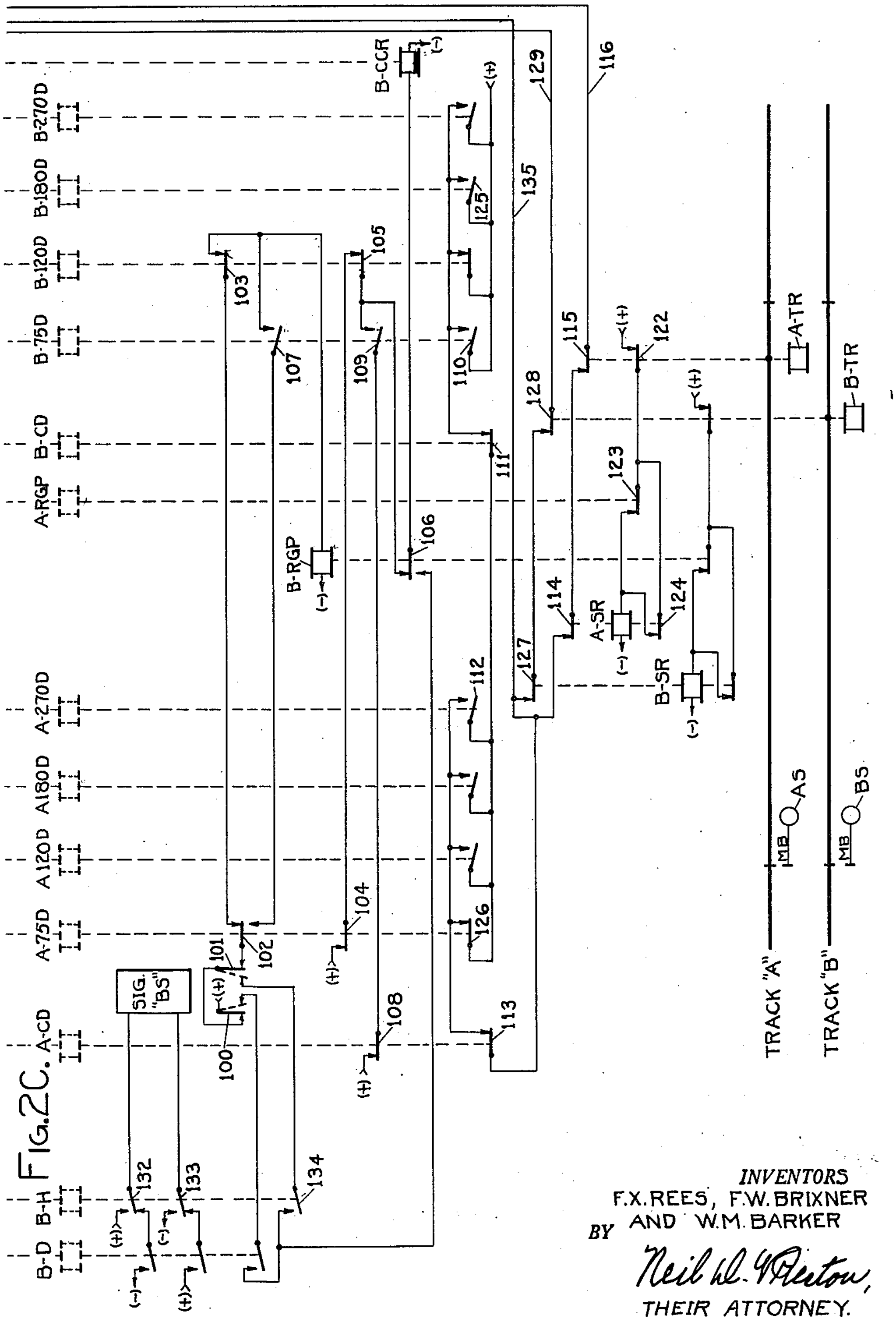

In describing the invention in detail, reference will be made to the accompanying drawings, in which like reference characters designate corresponding parts throughout the several views, and in which:

Fig. 1 is a diagrammatic block diagram to indicate the general organization of the system comprising the present invention;

Figs. 2A, 2B and 2C represent in diagrammatic manner the circuits and devices embodying the present invention, the circuits and devices of Fig. 2A constituting the office apparatus and the circuits and devices of Figs. 2B and 2C constituting the field station apparatus; and Fig. 3 is a code chart of the different rates employed under the different signal control conditions as provided in accordance with the system of the present invention.

For the purpose of simplifying the illustration and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice.

The symbols (+) and (−) are employed to indicate the positive and negative terminals respectively of suitable batteries, or other sources of direct current; and the circuits with which these symbols are used, are assumed to have current flowing in the same direction. However, it is to be understood that should alternating current be employed instead of direct current, such symbols would merely indicate the relative instantaneous polarities.

Referring to Fig. 1 of the accompanying drawings, it is noted that a line circuit formed by two line wires 5 and 6 connects a control office with a remote field station. This line circuit has associated therewith at the control office two carrier frequency transmitters 7 and 8, also and two carrier frequency receivers 9 and 10. A similar set of transmitting and receiving apparatus is also provided at the field station including transmitters 12 and 14, and receivers 11 and 13. The control office transmitters 7 and 8 are assumed to operate on frequencies *f1* and *f2* respectively, while its receivers 10 and 9 are for the frequencies *f3* and *f4* respectively. The receivers 11 and 13 at the field station are for the frequencies *f1* and *f2*; while the transmitters 12 and 14 are for the frequencies *f3* and *f4*. It is to be understood that these different frequencies may be selected as desired for the particular circumstances encountered in practice, but for clarity in the disclosure and wholly by way of a typical example, it may be stated that one selection of frequencies may be as follows:

*f1*=19.2 kc.; *f2*=11.1 kc.
*f3*=25.6 kc.; *f4*=14.8 kc.

The field station is along the trackway adjacent two manual block signals AS and BS. These signals are respectively for tracks A and B illustrated as single lines. The signals AS and BS have been designated as manual block signals by the letters "MB" immediately adjacent their symbols.

Each track is provided with a track circuit in advance of its respective manual block signal which is for the purpose of placing that signal at stop as the train passes. These track circuits are shown as having track relays A–TR and B–TR respectively.

Each signal has associated therewith a relay which is energized only while that signal is in a condition in correspondence with its then existing control code, and is deenergized at all other times. These relays have been designated A–CCR and B–CCR for the signals AS and BS respectively.

At the control office, signal control levers are provided for the signals, such as levers AL and BL. Also, a bank of indicators is provided for each signal to repeat the then existing indication of the associated signal.

Each control lever has been indicated as having associated therewith in Fig. 1, a rate selector which, as later will be described, includes contacts of lever repeater relays. Also, a group of code oscillator contacts is associated with the levers. The rate selector for each lever selects a rate at which the corresponding transmitter is coded, but this rate is selected dependent upon the rate selected by the other lever for the other carrier transmitter.

The rate transmitted over the carrier frequency *f1* by the transmitter 7 is received at the field station by the carrier $f1$ receiver 11 which acts through suitable decoding apparatus and dependent upon the energized condition of the track relay A–TR to control the signal AS.

The transmitter 12 at the field station is coded when the corresponding signal AS is displaying the same aspect as called for by the control code then being received. In other words, the code rate is determined by the received control rate, but this rate is retransmitted by the transmitter 12 only providing the signal AS is controlled in accordance with such particular rate. This has been indicated in Fig. 1 by the dotted line extending through a front contact 64 of the relay A–CCR.

The code repeated over the carrier frequency $f3$ is received at the control office by the carrier $f3$ receiver 10 and through the indication selector including contacts of the lever repeater relays, (later to be described) controls the signal indicators for the signal AS.

From the Fig. 1 and the above description, the general plan of organization and operation of the system can be understood in its broader aspects; but reference should be made to Figs. 2A, 2B and 2C together with the detailed description in order to understand the complete organization and operation of the system.

With reference to Fig. 2A, it will be seen that each signal control lever is provided with a repeater relay for each of its positions. More specifically, the signal control lever AL is provided with repeater relays A–RP, A–GP and A–YP, while the signal control lever BL is provided with repeater relays B–RP, B–GP and B–YP. A group of code oscillators of any suitable type, such as for example disclosed in the prior Patent No. 2,351,588 to O. S. Field, has merely been indicated conventionally as coding contacts with their respective rate designations associated therewith. For the sake of definiteness, these rates have been selected as 75, 120, 180 and 270 oscillations per minute, but other suitable rates might well be employed depending on the type of apparatus employed.

The lever repeater relays for each lever provide selective circuits so that a code transmitting relay is operated at a code rate selected for the corresponding signal by such lever and in accordance with the rate selected for the other signal. For example, a code transmitting relay A–CTP is operated intermittently in accordance with the position of the lever AL to transmit a suitable control code to the associated signal, but since that control code rate is selected dependent upon the rate of the control code for the other signal, the relay A–CTP is dependent upon selections including contacts of certain repeater relays for the lever BL. A similar relay B–CTP is associated with the lever BL for operation at the selected code rate in accordance with the same principles.

The carrier frequency transmitters may be of any suitable type, and for convenience are assumed to apply carrier frequency energy to the line wires when their respective keying circuits are closed. For example, when the relay A–CTP picks up, it closes front contact 20 to cause transmitter 7 to effect the transmission of the carrier frequency energy.

The carrier frequency receivers may be of any suitable type, and these receivers are all connected to the same line wires. Each carrier receiver is shown as having a normally picked up output relay which drops away in response to the reception of the carrier to which the receiver is tuned. For example, when the carrier frequency $f1$ is received by the receiver 11 (see Fig. 2B), the relay A–VX is dropped away. A similar relay B–VX is provided for the carrier $f2$ receiver 13. In the office, relays A–VXR and B–VXR (see Fig. 2A) are associated with the receivers 10 and 9 respectively. These relays are shown as being normally down because their receivers are normally receiving their respective carrier frequencies assuming a normal static condition. But codes are actually being transmitted in both directions continuously so that these receiver output relays are in continuous operation as presently to be described.

The A–VXR relay has contact 31 which energizes the primary winding of the decoding transformer A–DTR as the different code rates are received. The secondary winding of this decoding transformer A–DTR has connected thereto a slow acting relay A–CDR which through the contacts 33 and 34 of the code transmitting relay A–CTP coacting with the contact 32 of the relay A–VXR, effects the rectification of the currents induced in the secondary winding of the decoding transformer, so that the relay A–CDR is continuously picked up only so long as a code is received of the same rate and is in phase with that transmitted by the transmitter relay A–CTP. A similar decoding arrangement is associated with the relay B–VX.

Associated with the repeater relays for each control lever is a relay which momentarily changes its position each time the lever is shifted to a new position. For example, relay A–CS is associated with lever AL, and when relay A–CS is momentarily released it effects the picking up of a slow release stick relay A–TE. Associated with such stick relay A–TE is a slow release timing relay A–TEP, and these relays cooperate to interrupt the indication circuits for the associated signal indicators until there has been time for a new control to have been effective at the distant field station.

At the field station (see Figs. 2B and 2C), the carrier $f1$ receiver 11 is shown as having associated therewith a relay A–VX which is normally picked up but which is dropped away whenever a carrier frequency is received and in this way follows or repeats the code transmitted from the control office. Associated therewith is a decoding transformer A–DT that has energy in its primary windings intermittently reversed by contact 50 as a code is received. The secondary winding of this decoding transformer A–DT together with the contact 51 of relay A–VX causes the repeated energization of the relay A–CD in the same direction while a code is received, so that this relay remains picked up. While the code is received and the relay A–CD is picked up, another secondary winding of the decoding transformer A–DT provides energy pulses to the several decoding units A–DU for the different code rates involved since the front contact 52 of relay A–CD is closed. Associated with each decoding unit A–DU is a suitable decoding relay, such as relay A–75D, and each such relay has its circuit selected through a front contact of the relay A–CD and the decoding relay for the next higher code rate. A similar receiving organization is associated with the carrier $f2$ receiver 13.

Each signal AS and BS is controlled by its respective signal control relays A–H, A–D, B–H and B–D. These control relays A–D and A–H, B–D and B–H have their circuits selected through contacts of the decoding relays D for the two receivers in such a way as to cause the associated signals to be cleared only when it is proper.

As illustrated, the signals AS and BS are assumed to be of the searchlight type, such as shown for example in the prior Patent No. 2,376,534 to O. S. Field, but it is to be understood that any other suitable type signal could be employed. These searchlight type signals have contacts which are operated to different positions in accordance with the indications given by the signal, and these contacts in conjunction with the reception of the codes control a signal-at-stop relay, such as relay A–RGP for the signal AS. Each signal also has associated therewith a code correspondence relay, such as relay A–CCR, which is energized so long as the signal displays an aspect corresponding to the control code then being received.

Thus, if the signal AS is at stop, then the contacts 57 and 58 of the signal are in the position shown, and the relay A–RGP is energized. This causes the energization of the relay A–CCR so that front contact 64 is closed. Since the stop code of the 75 rate is being received, the front contact 65 of the relay A–VX is intermittently closed at that rate so that a repeat code of the 75 rate is transmitted by the carrier $f3$ transmitter 12. This repeat code is received at the central office by the carrier $f3$ receiver 9. As previously explained, operation of A–VXR effects the picking up of the relay A–CDR to close front contact 35 so that the circuit is completed for the proper indicator corresponding to the then existing control position of the lever AL. In this instance the red indicator R is energized; but if a caution code or clear code were being transmitted, the yellow or green indicators respectively would be selected, providing, of course, that the signal AS were in a corresponding position. During the transition from one control code to another, and until the signal actually responds to its new control, the indicators are caused to be extinguished as will be explained later.

Each track relay A–TR and B–TR has a stick relay A–SR and B–SR respectively associated with it, and so controlled as to make the corresponding signal of the stick signal type, i. e., a stop control must be received after each automatic return of the signal to stop before another clearing control can be effective.

It is believed that the nature of the invention, its advantages and characteristic features can be best understood with further description being set forth from the standpoint of operation.

OPERATION

*Normal conditions.*—Under normal conditions the control levers AL and BL are in their center stop positions to hold the signals AS and BS at stop. This causes a normal-at-stop code to be transmitted over the carrier frequencies $f1$ and $f2$ for the respective signals. This normal code is of the 75 rate for the signal AS, and is of the 120 rate for the signal BS. This is indicated in the chart of codes illustrated in Fig. 3.

More specifically, the code transmitting relay A–CTP is intermittently energized at the 75 code rate by a circuit closed from (+), through a 75 coding contact, back contact 21 of lever repeating relay A–YP, back contact 22 of lever repeating relay A–GP, front contact 23 of relay B–CS, front contact 24 of relay A–CS, windings of code transmitting relay A–CTP, to (−). The resulting intermittent operation of this relay A–CTP at the 75 rate, of course, operates contact 20 to close and open the control of the carrier $f1$ transmitter 7 to cause the code to be transmitted over the line wires 5 and 6 to the field station.

At the field station the carrier $f1$ receiver 11 is responsive to such carrier frequency $f1$ and thus causes the intermittent operation of the associated output relay A–VX. The operation of contact 50 causes the primary winding of decoding transformer A–DT to be energized in opposite directions alternately to induce pulses at the 75 code rate in its secondary windings. The lower secondary winding of this decoding transformer A–DT supplies pulses successively in the same direction to the control relay A–CD because of the rectifying contact 51 of the relay A–VX. Since this relay A–CD is slightly slow acting, it remains steadily picked up so long as a code of the 75 rate or higher is received. With this relay A–CD picked up, it closes its front contact 52 so that the pulses from the upper secondary winding of the transformer A–DT are supplied to the bus wires 53 and 54 to which are connected the different decoding units for the different code rates. In this instance, pulses of the 75 code rate are applied to the bus wires 53 and 54 so that the decoding unit A–DU75 is effective to cause the response of the decoding relay A–75D which output circuit includes a back contact 55 of the decoding relay A–120D and a front contact 56 of the control decoding relay A–CD.

Since the signal AS is at stop, its contacts 57 and 58 are in the positions shown to connect (+) through a circuit including front contact 59 of relay A–75D, back contact 60 of relay B–75D, windings of relay A–RGP, to (−).

With the red-green repeater relay A–RGP picked up, a circuit is closed for the correspondence relay A–CCR from (+), through a circuit including front contact 61 of relay B–CD, front contact 62 of relay A–75D, front contact 63 of relay A–RGP, windings of relay A–CCR, to (−).

Thus, while the stop code is being transmitted over the carrier frequency $f1$, and the signal is in a correspondingly controlled condition, the front contact 64 of relay A–CCR is closed. Thus, each time a code pulse of the 75 rate is repeated by the relay A–VX, the control circuit for the carrier $f3$ transmitter 12 is closed at front contact 65 to cause the transmission of a corresponding code pulse over the carrier frequency $f3$. In other words, a code of the 75 rate is transmitted from the field station to the control office over the carrier frequency $f3$ which is received by the carrier $f3$ receiver 9.

This 75 code transmitted over the carrier frequency $f3$ is received by the carrier $f3$ receiver 9 and causes the intermittent operation of the relay A–VXR at the 75 rate. The operation of its contact 31 acts to reverse the direction of current flow in the primary windings of the decoding transformer A–DTR so that the code pulses produced in the secondary winding of this transformer A–DTR can be rectified at contact 32 which, of course, operates at the 75 rate in phase with the contacts 33 and 34 of the code transmitting relay A–CTP. In other words, the reception of a code at the same code rate allows current to intermittently flow through the windings of relay A–CDR, and since this relay is slightly slow releasing, it remains picked up so long as such a code rate is received.

On the other hand, if the operation of contacts 31 and 32 were at a rate different than the rate at which the code transmitting relay A–CTP is operated, then the relay A–CDR would not be picked up. Also, in the event that there should be a "cross-fire" between transmitter 7 and receiver 9, the relay A–VXR would drop away each time the relay A–CTP picked up to place a carrier frequency $f1$ on the line. Thus, the relays A–CTP and A–VXR would be 180° out of phase in a situation of this kind and no energy would be applied to the relay A–CDR.

With the relay A–CDR picked up, a circuit is closed for the red indicator R associated with the indicators for the signal AS, which circuit is closed from (+), and including front contact 35 of relay A–CDR, back contact 36 of relay A–TE, front contact 37 of relay A–TEP, front contact 38 of relay A–RP, indicator lamp R, to (−). In this way, an indication is given that the signal AS at the field location is controlled to display a red aspect to correspond to the control position of the signal lever AL.

In a similar manner, the 120 rate code is caused to be transmitted by the carrier $f2$ transmitter 8 by reason of the operation of the code transmitter relay B–CTP. The circuit for causing this operation is closed from (+), through the 120 code oscillator contacts, back contact 25 of relay A–YP, back contact 26 of relay B–YP, back contact 27 of relay A–GP, back contact 28 of relay B–GP, front contact 29 of relay B–CS, front contact 30 of relay A–CS, windings of relay B–CTP, to (−). The transmission of the 120 code rate over the carrier frequency $f2$ is, of course, received by the carrier $f2$ receiver 13 which acts through the decoding transformer B–DT, the same as described for the decoding transformer A–DT, to cause the decoding control relay B–CD to be maintained in a picked up condition. The closure of front contact 66, of course, causes the pulses of the 120 rate to be applied to the bus wires 67 and 68 which by reason of the decoding unit B–DU120 causes the response of the decoding relay B–120D. This output circuit for the decoding relay B–120D includes back contact 69 of decoding relay B–180D, back contact 70 of decoding relay B–270D, and front contact 71 of decoding control relay B–CD.

Since the signal BS is in its stop condition, the red-green repeater relay B–RGP is energized by reason of a circuit closed from (+), through a circuit including signal contacts 100 and 101 in the positions shown, front contact 102 of decoding relay A–75D, front contact 103 of decoding relay B–120D, windings of relay B–RGP, to (−).

The correspondence relay B–CCR is energized by reason of a circuit closed from (+), and including front contact 104 of decoding relay A–75D, front contact 105 of relay B–120D, front contact 106 of relay B–RGP, windings of relay B–CCR, to (−).

This causes the closure of contact 72 of the relay B–CCR so that the intermittent operation of the contact 73 of the relay B–VX at the 120 rate, causes the control for the carrier *f4* transmitter 14 to be intermittently closed at the 120 rate. This coding of the carrier frequency *f4* at the 120 rate is received by the carrier *f4* receiver 10 at the control office to cause the intermittent operation of the contacts of the relay B–VXR at a corresponding rate.

The operation of relay B–VXR acts on the decoding transformer B–DTR the same as described above in connection with the decoding transformer A–DTR. The contacts of relay B–VXR also cooperate through suitable circuits with the contacts of code transmitting relay B–CTP to energize the relay B–CDR in a manner similar to that described for relay A–CDR. In this instance, the relay B–CTP is operated at the 120 code rate, and the relay B–VXR is repeating this code rate in phase with relay B–CTP.

With the relay B–CDR picked up, a circuit is closed for the red indicator R for the signal BS from (+), through a circuit including front contact 90 of relay B–CDR, back contact 91 of relay B–TE, front contact 92 of relay B–TEP, front contact 93 of relay B–RP, indicator lamp R, to (−). In this way, an indication is given in the office that the signal BS at the field location is displaying a red aspect to correspond with its control as provided by the lever BL in its stop position.

From the above description, it can thus be seen that under the normal conditions, the signals AS and BS are held at stop and corresponding indications are given in the control office. It might be noted here that the signals are at stop because their signal control relays A–H, A–D, B–H and B–D are all deenergized; and this deenergization is because the circuits for these signal control relays are open by reason of their positive selections, which selections do not include contacts closed by the normal stop codes. Thus, even though the normal stop codes should cease to be transmitted or received, the signals would still remain at stop. The normal stop code is more particularly for the purpose of providing a way of transmitting a code to the office in accordance with the stop condition of the associated signal to give a positive stop indication in the office. It will be apparent that the correspondence indication of the repeat type employed could not be used if no code were being transmitted from the control office.

*Clearing signal AS.*—Let us assume that the operator desires to clear the signal AS, and to do so moves the lever AL to a right-hand position to energize the relay A–GP through an obvious circuit. Since the lever BL is assumed to still be in its stop position, the picking up of the relay A–GP takes place to shift the circuit for the relay A–CTP to the 270 code oscillator by reason of its closed front contact 22 and back contact 39 of relay B–GP. This causes a shift in the code rate following a momentary opening of front contact 24 of the relay A–CS. This is because the relay A–RP drops and opens its front contact 40 before the relay A–GP can pick up in response to the operation of lever AL to its right-hand position. This provides a momentary deenergization of relay A–CS so that it drops away. This relay A–CS is also slightly slow in picking up which is accentuated by the resistor included in its circuit. Thus, with back contact 40 closed and front contact 41 closed, the relay A–CS picks up after a short interval which is sufficient in length to prevent the transmission of the new 270 code rate until after the relay A–CD at the field station (see Fig. 2B) has dropped away and opened the energizing circuit for the relay A–75D. The opening of front contact 56 of relay A–CD causes the decoding relay A–75D to quickly drop away before the next code rate is received. This assures that the decoding relay A–75D will drop away and not inadvertently remain up during the reception of a higher code rate.

In addition, the momentary dropping away of the relay A–CS in response to a lever operation to a new position, causes the momentary closure of its back contact 42 to complete an obvious pick-up circuit for the timing relay A–TE. The picking up of the relay A–TE closes a stick circuit including front contact 43 of relay A–TEP, and front contact 44 of relay A–TE. Thus, the relay A–TE is stuck up even though the contact 42 immediately picks up. The opening of back contact 45 of relay A–TE deenergizes the slow releasing timing relay A–TEP so that after a time measured by its release period, the front contact 43 is opened which opens the stick circuit of the relay A–TE allowing it to drop away. Upon its release and the closure of contact 45, the relay A–TEP is energized through resistor 46 causing it to be slowly picked up. This resistor is shunted out by front contact 47 when relay A–TEP is picked up so as to provide normal energization of the relay and render it slower in releasing. The important fact to note is that during the picked up condition of relay A–TE the back contact 36 is open and during the released condition of relay A–TEP the front contact 37 is open. Thus, these two contacts 36 and 37 cause the indication circuit for the indicators associated with the signal AS to be held open for a time including the slow release period of relay A–TEP, the slow release period of relay A–TE and the slow pick-up period of relay A–TEP. The summation of these times is long enough for the old indication conditions to cease and drop the relay A–CDR opening front contact 35 to maintain the indicators for signal AS deenergized until the new indication conditions are established. In brief, the cessation of the 75 code drops the relay A–CD (see Fig. 2B) which in turn opens the circuits for relays A–RGP and A–CCR. The relay A–RGP drops away at once, but the relay A–CCR does not drop away for a much longer period of time. In fact, this relay A–CCR is sufficiently slow releasing to maintain its contacts in picked up positions during a shift from one code to another when no change in the signal control is to be effected, as will be later explained in detail. When relay A–CCR releases and opens front contact 64, there is assured that no code will be repeated over the carrier frequency *f3*, so that the relay A–CDR in the office (see Fig. 2A) is also assured of being released at the time that back contact 36 and front contact 37 are both closed. Thus, the time measured by the relays A–TE and A–TEP is longer than the release time of the relay A–CCR with sufficient additional time for masking out transient conditions. In other words, all of the indicators for signal AS are deenergized during which a signal is being controlled to a new position.

As above mentioned, the picking up of the lever repeater A–GP closes front contact 22 and thereby causes the operation of the code transmitting relay A–CTP at the 270 rate. At the same time, the closure of the front contact 27 completes a circuit through back contact 48 of relay B–YP to cause the code transmitter relay B–CTP to operate at the 75 code rate. In this way, the operation of the lever AL to its right-hand clearing position (green) causes the 270 code rate to be transmitted over the carrier frequency *f1* and causes the 75 code rate to be transmitted over the carrier frequency *f2*.

Referring to Fig. 2B, it will be noted that the reception of the 270 code rate, after brief interval during which relay A–CD is dropped away, operates the relay A–VX at such rate and causes the relay A–CD to again be picked up. Thus, pulses of the 270 rate are supplied to the decoding unit A–DU270 which effects the response of the decoding relay A–270D. The decoding relay A–75D has, of course, previously dropped away.

Before considering how the signal AS is cleared to give the green aspect, it should be remembered that the shift of the lever AL to its right-hand position also changed the circuit connections so that the 75 code is placed on the carrier frequency *f2* instead of the 120 code rate after the interval of time during which the relay A–CS (see Fig. 2A) is dropped away. During this interval of time the relay B–CD (see Fig. 2B) is dropped away which quickly releases the decoding relay B–120D. This opens the circuit for the relay B–RGP and also the circuit for the relay B–CCR. The dropping of the relay B–RGP does not effect the transmission of indication pulses because the relay B–CCR is sufficiently slow acting to remain picked up until the new code is received and the decoding relays B–CD and B–75D are both picked up. Thus, as soon as the 75 code is received by the carrier frequency *f2* receiver 13 the relay B–VX operates at the 75 rate so that its contact can immediately transmit indication pulses to the central office, and in fact this occurs sufficiently quickly so that the relay B–CDR in the office does not have time to drop away. In other words, the brief interval of time during which the relay A–CS opens contact 30 is shorter than the release time of the relay B–CDR. In this way, the shift of the code rate for the signal BS does not cause any interruption of the signal indicators in the office.

In connection with this shift in the code for the signal BS, it is noted that there is a new circuit established for the relay B–RGP from (+), through a circuit including contacts 100 and 101 of signal BS in their positions shown, back contact 102 of relay A–75D, front contact 107 of relay B–75D, windings of relay B–RGP, to (−).

Also, this shift in the code for the signal BS continues the energization of the correspondence relay B–CCR by reason of a circuit closed from (+), and including front contact 108 of relay A–CD, front contact 109 of relay B–75D, front contact 106 of relay B–RGP, windings of relay B–CCR, to (−). Thus, the contact 72 of relay B–CCR remains closed and the 75 code rate is repeated to the control office. In this way, the relays B–CTP and B–VXR at the control office operate in unison to maintain the relay B–CDR picked up and the indicator R for the signal BS remains illuminated.

With the above conditions existent at the field station, a circuit is closed for energizing the signal control relay A–D. This circuit extends from (+) (see Fig. 2C), through a circuit including front contact 110 of relay B–75D, front contact 111 of relay B–CD, front contact 112 of relay A–270D, front contact 113 of relay A–CD, front contact 114 of relay A–SR, front contact 115 of track relay A–TR, wire 116 (see Fig. 2B), back contact 117 of relay B–270D, front contact 118 of relay A–270D, windings of relay A–D, to (−).

The picking up of signal control relay A–D closes front contacts 119 and 120 to energize the mechanism of signal AS with the proper polarity to cause it to display a green aspect. This causes the contact 57 of the signal AS to be operated to its right-hand position in which a circuit is closed for energizing the correspondence relay A–CCR. This circuit is closed from (+), and includes contact 57 of signal AS in a right-hand position, front contact 121 of relay A–D, back contact 63 of relay A–RGP, windings of relay A–CCR, to (−).

This energization of relay A–CCR closes front contact 64 and causes the 270 code rate operation of relay A–VX to be repeated to the carrier *f3* transmitter 12 so that a corresponding 270 code is received by the relay A–VXR in the office. The operation of the relays A–CTP and A–VXR in unison (i. e. in phase) at the 270 code rate causes the relay A–CDR to be picked up and close front contact 35. This is effected sometime after the contacts 36 and 37 are again both closed following the timing operations of relays A–TE and A–TEP. With the front contact 49 of relay A–GP closed (it being understood that front contact 38 is open), the indicator G for the signal AS is energized giving the operator the information that the signal AS has responded to his operation of the lever AL.

*Passage of a train.*—Assuming that a train travelling on track A accepts the green proceed indication given by the signal AS, it passes onto the track section in advance of the signal and deenergizes the track relay A–TR.

It will be noted that normally the stick relay A–SR is energized by reason of a circuit closed from (+), through front contact 122 of track relay A–TR, front contact 123 of relay A–RGP, windings of relay A–SR, to (−). With this relay picked up it closes front contact 124 to shunt the front contact 123 of the relay RGP. Thus, when the signal AS was cleared, it is noted that the relay A–RGP was deenergized opening front contact 123; but, because of front contact 124, the relay A–SR remained picked up until the train enters the track section and releases the track relay A–TR. The opening of contacts 115 and 114 of these relays A–TR and A–SR deenergizes the signal control relay A–D so that the signal AS is restored to stop.

However, the signal cannot again be cleared until a stop control has been transmitted to the field station to effect the picking up of the relay A–RGP and the restoration of the relay A–SR. In other words, the passage of the train automatically places the signal AS at stop, but this must be recognized by the operator and his control lever AL returned to stop before the signal can again be cleared for another train. This assures that only a single train will pass the signal for each clearing control.

When the train enters the track section releasing track relay A–TR to open front contact 115 which causes the deenergization of the relay A–D, this relay A–D opens front contact 121 which deenergizes the correspondence relay A–CCR. This opens the front contact 64 and prevents the repeating of the 270 control code by the carrier frequency transmitter 12. This, of course, causes the release of the relay A–CDR at the control office and deenergizes the indicator G associated with signal AS. This advises the operator that the signal AS has been restored to stop. The operator thus restores his lever AL to the stop position. This causes the 75 code to be again transmitted over the carrier frequency *f1* and the 120 code to be again transmitted over the carrier frequency *f3*. This restores the normal control conditions at the field station and reenergizes the relays A–RGP and A–CCR which results in the repeating of the 75 code over the carrier *f3* so that the red indicator R associated with signal AS will be energized through front contact 38 of the lever repeating relay A–RP.

At the field station, the reenergization of the relay A–RGP closes front contact 123 and allows the stick relay A–SR to be picked up through front contact 122 of the track relay A–TR when the train has passed beyond the associated track section. This restoration of the stick relay A–SR recloses front contact 114 which would then permit the signal AS to be again cleared.

It is assumed in connection with the above description, that there is suitable means not shown for indicating to the operator when trains are in approach to the signal AS and BS and also when the respective track sections for the track relays A–TR and B–TR are occupied by trains. Such indication means has not been shown, since it has no particular bearing upon the functioning of the present invention. However, it is mentioned so that it will be easier to understand the relationships between the operation of the signal control levers AL and BL and the traffic conditions in the field. For example, when a train is in approach to the signal AS, the operator may or may not desire to clear the signal depending upon traffic conditions in advance of which he is aware. Also, when the train has passed beyond the signal AS, the operator cannot again clear the signal AS until the train has passed beyond the track section associated with the track relay A–TR while the lever AL is in a stop controlling position. It is thus seen that the operator must be advised by additional indication means when the train has passed beyond this track section.

Also, the manual block signals must not be cleared, unless the entire stretch of track is clear to the next manual block signal location. For this reason, the operator must be advised that the stretch is not occupied either by an operator at the next manual block signal location, or suitable additional indication means (not shown) must be provided. In any event, when the signal is cleared, as above described, the manual block signal is preferably made a stick signal so as to prevent the erroneous clearing of a signal for a following train in the event that the operator should fail to restore the control lever AL, for example, to a stop position before the train leaves the track section associated with the track relay A–TR. However, there are circumstances when it is necessary to send a second train into manual block territory that is already occupied by a first train; and, for this reason, the caution aspect of the signals AS and BS has not been given stick control. For example, if a train were still standing on the track section associated with the track relay A–TR, but a second train needed to make connection therewith, it would be necessary to cause the signal AS to display a caution aspect to allow it to proceed up to the first train. In other words, the caution or yellow aspect of the signal AS, for example, is to be considered what is often termed a "call-on" signal indication, i. e. it is a signal aspect which indicates to a train that the section in advance is occupied by a first train, and that the second train must proceed prepared to stop short of an obstruction upon sight of that obstruction. It is, of course, to be understood that the signal indications may be given various significances and that various arrangements may be employed, the specific embodiment being shown to indicate the versatility of the present invention in meeting the condition of practice.

*Clearing of signal BS.*—From the above description, it should be apparent that a shift in the code rate for the signal AS over the carrier frequency *f*1 may cause a shift in the frequency *f*2 for the stop control of signal BS. Referring to the code chart shown in Fig. 3, it will be noted that the signal AS may be controlled to give a green aspect either by the 270 rate or the 180 rate dependent upon the particular aspect to which the signal BS is controlled. In the example given, the signal BS was maintained at stop by the 75 code rate and this called for a 270 rate for the signal AS. On the other hand, if the signal BS is to be controlled to caution aspect for example by the 120 code rate then the signal AS is maintained clear by the 270 rate; whereas, if the signal BS is caused to have a green aspect by the 270 rate then the signal AS is caused to have a green aspect by the 180 code rate.

It is believed to be unnecessary to describe the exact conditions and combinations of conditions for every aspect which the two signals AS and BS may give, since the code chart represents the particular code rate selections and the circuits disclosed in Figs. 2A, 2B and 2C to give these different codes. However, it may de desirable to describe briefly how the signal BS may be caused to display a caution or yellow (Y) aspect. In this connection, it will be observed that the control of the signal BS to a caution or yellow displaying aspect is for the purpose of clearing the signal for a second train while the block in advance is occupied by a first train, for reasons above described.

Assuming that the lever BL is operated to the left-hand position, the relay B–YP is picked up closing front contact 26 to shift the operation of the code transmitter relay B–CTP to the 180 code rate from its normal 120 rate. It can be seen that this shift or picking up of the relay B–YP in no way affects a change on the control of the relay A–CTP, and this should be expected by an examination of the code chart of Fig. 3 where it can be seen that a shift to the 180 code rate or the 270 code rate for the signal BS does not require any change in the code rate for the signal AS either when it is giving a red aspect (R) or a yellow aspect (Y).

The operation of the lever BL, of course, deenergizes relay B–GP and picks up relay B–YP which, of course, results in the temporary dropping away of the relay B–CS. This causes a temporary interruption at front contact 23 of the circuit for the code transmitting relay A–CTP. But this does not interrupt the circuit for the associated indicators because relay A–CDR remains picked up for this short interval, even though the relays A–CD and A–DU75 in the field drop away temporarily. This is because the relay A–CCR is slow releasing and rides over this short time. Also, the temporary opening of front contact 29 causes the delay of the code transmission sufficiently long to drop the relay B–CD and the relay B–120D. This releases relay B–RGP so the circuit for relay B–CCR is opened until the signal mechanism responds to the 180 code. After this temporary delay, the 180 code is received and the relay B–CD is picked up along with the decoding relay B–180D. During the operating time of the signal control relay and signal mechanism, the relay B–CCR drops away discontinuing the transmission of a repeat code; but during this time the relays B–TE and B–TEP have at contacts 91 and 92 held the circuits open for the indicators associated with signal BS.

The picking up of the decoding relay B–180D closes an energizing circuit for the relay B–H from (+), and including front contact 125 (see Fig. 2C) of relay B–180D, front contact 111 of relay B–CD, front contact 126 of relay A–75D, front contact 113 of relay A–CD, wire 135, front contact 130 of relay B–180D, back contact 131 of relay A–180D, windings of relay B–H, to (−).

This picking up of the relay B–H closes the contacts 132 and 133 to supply the proper polarity of energy to the mechanism of signal BS to cause it to display a yellow (Y) aspect. This operates the contact 101 of the signal BS to its left-hand position so that a circuit is closed including front contact 134 of the relay B–H to energize the correspondence relay B–CCR and close front contact 72 to cause the transmission of the repeat indication code.

It is noted that the passage of the train does not automatically restore the signal BS from its caution (Y) displaying aspect to a stop displaying aspect (R) because neither a track contact nor a stick relay contact is included in its signal control relay circuit. For this reason, when the operator notes the passage of the second train into the track section it is dependent upon him to restore the lever BL to its stop position if he does not want a third train to pass into the section in the event there is one following the second train. These various traffic conditions may vary in accordance with different conditions found in practice and should not in any way be considered to limit the scope of the present invention.

*Signal circuit selections.*—From the above description, it will be seen that each signal control relay such as A–H and A–D for signal AS, and B–H and B–D for signal BS is effected by the inclusion of a front contact for the decoding relays associated with that signal. For example, relay A–D includes front contact 118 of decoding relay A–270D. Similarly, the control relay B–H includes a front contact 130 of the decoding relay B–180D. Also, these same circuits when including such front contact also include a back contact of the decoding relay for the same rate for the other signal. For example, the circuit including front contact 118 also includes back contact 117. Similarly, the circuit including front contact 130 also includes the back contact 131.

In this way, it will be seen that each signal clearing circuit is checked against "cross-fire" or "cross-talk" by reason of the fact that the reception of a code for the other signal by reason of "cross-talk" results in the opening of the circuit for the signal for which such rate was originally intended. In other words, if both the carrier frequencies $f1$ and $f2$ are coded at the same rate no control whatever is effected for either signal.

With reference to Fig. 3, it can be seen that for any given aspect for signal AS, a particular rate is employed which rate is not found for any of the three aspects of signal BS which are used under that particular condition. More specifically, when the 75 rate is used for the signal AS, only the rates 120, 180 and 270 are used for the signal BS.

From this it will be observed that it would be possible to use only the 180 rate for the green aspect (G) for the signal AS, but that would not provide a decoding unit and decoding relay associated with the signal AS which would respond to the 270 rate in the event of "cross-talk." For this reason, both signals are provided with the same decoding units and corresponding back contact checks, so that in the event of "cross-talk," there will be a back contact in the circuit then closed by that rate which will be open and prevent the possibility of any control. This is the reason why two different code rates for the green (G) aspect of the signal AS appear in the code chart and are used in the structural organization.

The description given above with respect to the operation should make evident that the time interval between codes inserted by the relays A–CS and B–CS is effective to momentarily release the relays A–CD and B–CD. This opening of the circuits for the various decoding relays, such as for example the decoding relay A–75D at front contact 56, provides that the decoding relays drop away quickly before the new code is applied to pick up a different decoding relay. The usual decoding relay is somewhat slow to release not only due to its own structure but because the decoding units usually include rectifiers in multiple with the decoding relay, which tends to make the relay slow to release. By including a front contact on relay A–CD, for example, in the circuit for each of the decoding relays associated with it, assures that there is no overlap between the operated conditions of two different decoding relays in the same group.

Another characteristic of decoding units and their associated decoding relays should be considered, more particularly with respect to the band of response of a decoding relay to different code rates. More specifically, the decoding relay A–120D does not respond to the 75 rate and the rate at which it will respond must be fairly close to the 120 rate. However, the decoding relay A–120D will respond to quite a range of rates above the 120 rate; and if the decoding relay were left in a picked up position it might, due to variations in voltages and the like, be maintained picked up upon the reception of the next higher rate such as 180. Thus, by dropping away the decoding relay which is up for the old rate before the new rate is applied, assures a greater reliability in the response of the decoding relays to their respective rates.

A still further feature is provided to assure proper response, since the circuit for each decoding relay includes a back contact of at least the decoding relay for the next higher rate. For example, the decoding relay A–75D includes a back contact 55 of the decoding relay A–120D. This assures that the picking up of the decoding relay for this higher 120 rate will positively prevent the response of the decoding relay A–75D. It will be noted that the decoding relays for the 120 rate include back contacts of both of the decoding relays for the higher 180 and 270 rates.

In addition, there is another requirement which provides that neither signal will be controlled to a clear or caution aspect displaying condition unless there is a code rate on both of the frequencies $f1$ and $f2$. This is the reason for the series of multiple contacts shown in Fig. 2C including contacts 110, 112, 125, 126, etc. For example, when the 270 code rate is received for the signal AS closing front contact 113 the decoding relay B–270D is checked as being down by reason of back contact 117, but the circuit for the relay A–D cannot be closed unless one of the other decoding relays is picked up. In the particular instance illustrated, front contact 110 is required to be closed. These series of multiple contacts are employed to simplify the contact selections, it, of course, being understood that such front contacts could be otherwise placed in the circuits.

It should be noted in connection with the timing relays that they might be picked up by various means upon each operation of a control lever, the particular control by their respective relays such as relay A–CS has been selected merely as a convenient form of momentary control. In this connection, it can also be noted that the front contacts of these relays, such as contacts 23 and 24, 29 and 30 included in the code transmitter relay circuits, are for the purpose of checking that these relays do not become permanently deenergized upon the failure of some contact or the like. This is, of course, in addition to providing the delay of code transmission. For example, if the relay A–CS should release and fail to pick up, then the relay A–TE would fail to release and there would be an apparent failure so far as the indicators were concerned in the response of the signal. For this reason, no code is to be transmitted in the event of the failure of either of these relays.

Having thus described a carrier current control system for remote manual block signals as one specific embodiment of the present invention; it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What we claim is:

1. In a carrier frequency control system, a signalling device located at a remote station, a control lever at an office manually operable to different positions, means governed by said control lever for controlling said signalling device to different conditions by coding a particular carrier frequency at different rates selected by the position of said lever, means at the remote station for repeating the code rate of said particular carrier frequency for coding a different carrier frequency to control an indication relay at the office when said signalling device has responded to its control, an indicator at the office for each different controlled condition of said signalling device, and circuit means at the office for energizing the indicating relay for the then existing position of said lever corresponding to the controlled condition of said signalling device only providing said indicating relay is controlled by the reception of a repeated code over said different carrier frequency.

2. In a carrier frequency control system, two remotely located manual block signals for governing traffic into different stretches of track, a carrier frequency transmitter for each of two different frequencies at a control office for transmitting its respective frequency over the same conducting medium to the remote signal location, a carrier frequency receiver at said remote signal location for each of said two different frequencies, a control lever at the control office for each of said signals, a plurality of coding contacts at the office operating at different rates, circuit means controlled by said levers for selecting different code rate contacts for the different positions of each of said levers for coding the corresponding carrier frequency transmitter, said circuit means acting to select code rate contacts in such a way that both said two different carrier frequencies may be coded at the same time but are never coded at the same rate at the same time, and circuit means at the remote station controlled by said carrier frequency receivers jointly for decoding said rates and controlling said signals respectively in accordance with the rate then received over the corresponding carrier frequency only providing both said receivers do not have their respective carrier frequencies coded at the same rate at the same time, whereby said two signals may be independently controlled by their respective control levers.

3. In a carrier frequency control system, a signalling device located at a remote station, a control lever at an office manually operable to different positions, a carrier frequency transmitter at the office and a carrier frequency receiver at the remote station both operative on a particular carrier frequency, a plurality of coding contacts at the office operating at different rates, circuit means governed by said control lever in its different positions for selecting different code rate contacts for acting on said carrier frequency transmitter for coding its carrier frequency at such selected rate, decoding means at the remote station governed by said carrier frequency receiver for effecting the distinctive control of said signalling device in accordance with the rate at which said particular carrier frequency is coded, a carrier frequency transmitter at the remote station and a carrier frequency receiver at the office both operative on a different carrier frequency, circuit means at the remote station controlled by said decoding means at that station for causing said associated carrier transmitter to repeat the code of said different carrier frequency only providing said signalling device responds to its distinctive control, and indication means controlled by said carrier receiver at the office in response to the reception of said different carrier frequency only providing its coding exactly corresponds in rate to the rate of the code rate contact then selected for coding said particular carrier frequency.

4. In a carrier frequency control system, a remotely located manual block signal for governing traffic into a stretch of nonsignalled territory, a control lever at an office manually operable to a clear or stop position, a carrier frequency transmitter at the office and a carrier frequency receiver at the remote station both operative on a particular carrier frequency, a plurality of coding contacts at the office operating at different rates, circuit means governed by said control lever in its clear and stop positions for selecting a different code rate for each of said positions respectively, said circuit means causing the selected code rate contact to act on the associated carrier frequency transmitter for coding its carrier frequency at the rate selected by the then existing position of said lever, a clearing relay, a stop relay, decoding means at the remote station governed by said carrier frequency receiver for effecting the picking up of said clearing relay or said stop relay in accordance with the rate at which said particular frequency is coded, circuit means controlled by said clearing relay when picked up for causing said signal to be controlled to give a clear aspect, and other circuit means responsive to the passage of a train for causing said signal to be restored to stop independently of the picked up condition of said clearing relay and requiring said stop relay to be controlled subsequent to such train passage before said clearing relay can again be effective to clear said signal.

5. In a carrier frequency control system, a signalling device located at a remote station, a control lever at an office manually operable to different controlling positions, a carrier frequency transmitter at the office and a carrier frequency receiver at the remote station both operative on a particular first carrier frequency, a plurality of code rate contacts at the office operating at different predetermined rates, circuit means governed by said control lever in its different controlling positions for selecting different code rate contacts for acting on the associated carrier frequency transmitter for coding its carrier frequency at a rate selected in accordance with the then existing position of said control lever, decoding means at the remote station governed by said carrier frequency receiver for effecting the distinctive control of said signalling device in accordance with the rate at which said particular carrier frequency is then coded, a carrier frequency transmitter at the remote station and a carrier frequency receiver at the office both operative on a second carrier frequency, circuit means at the remote station for causing the associated carrier transmitter to code said different carrier frequency at the same rate as that at which said particular carrier frequency is coded when said signalling device responds to its distinctive control by said decoding means, an indication relay at the office controlled by the associated carrier receiver in response to the coding of said different carrier frequency, a plurality of indicators in the office, one for each different position of said control lever, circuit means for energizing the indicator corresponding to the existing position of said lever when said indication relay is energized, and means preventing the energization of said indicators regardless of the condition of said indication relay for a predetermined time following each manual actuation of said lever to a different control position.

6. In a carrier frequency control system, two signalling devices located at a remote station, a control lever at an office for each of said signalling devices and each being independently manually operable to different controlling positions, a carrier frequency transmitter for each of two different carrier frequencies at the office for transmitting its respective frequency over the same conducting medium to the remote station, a carrier frequency receiver for each of said two different carrier frequencies at the remote station and respectively responsive to the carrier frequencies received over such conducting medium, a plurality of code rate contacts at the office operating at different predetermined rates, circuit means at the office controlled by each lever for rendering selected ones of said code rate contacts effective for the different positions of that lever to code the carrier frequency associated with that lever, said different rates being used for the different positions of both levers, but said circuit means acting with respect to both levers jointly to always select different rates to code said two carrier frequencies at any one time, decoding means at the remote station for each of said carrier frequency receivers and responsive to the code rate received over the corresponding carrier frequency to give an distinctive control, each of said decoding means being responsive to the same plurality of different code rates, and circuit means controlled by said two decoding means jointly for governing said two signalling devices in accordance with the code rate received for that device over its corresponding carrier frequency only providing the same code rate is never acting on both decoders at any one time.

7. In a carrier frequency signal control system, a signal operable to display a plurality of different aspects including clear and stop, a carrier frequency communication system for transmitting clear and stop codes from an office to a remote station at said signal, decoding means at the remote station responsive to said clear and stop codes, circuit means for causing said signal to display a clear aspect only when said decoding means is responsive to a clear code and to always display a stop aspect in the absence of such clear code regardless of whether or not said stop code is received, another carrier frequency communication system between said remote station and said office, and code transmitting means controlled by the reception of a clear or stop code by said decoding means for repeating such code over said another carrier frequency for transmitting an indication code in accordance with the clear or stop aspect which the signal is then displaying only providing it is in correspondence with its control code, whereby an indication of said signal as giving a stop aspect can be given only providing the stop control code is being received.

8. In a carrier frequency control and indication system, a traffic governing device at a remote station operable to different conditions, a carrier frequency communication channel extending between a control office and a remote location, said channel being operative on a particular carrier frequency, code transmitting apparatus at the control office including oscillators for providing codes of different rates, manually operable means at the control office for selectively rendering said code transmitting apparatus effective to transmit any one of said different codes over said carrier frequency communication channel, decoding means at the remote station responsive to the reception of said different codes over said communication channel for controlling said traffic governing device to its different conditions, another carrier frequency communication channel extending between said remote station and said control office and operated on another selected frequency, circuit means at the remote station acting when said traffic governing device has responded to its control code to cause a corresponding code to be impressed on said another communication channel, and decoding apparatus at said control office jointly controlled by said code transmitting and said code receiving apparatus only in response to the same code rate for giving a distinctive indication.

9. In a remote control system, a manual block signal remote from a control office, a first transmitting means at the control office and a first receiving means at said remote signal interconnected by a communication channel for a first carrier frequency, means at the control office including a control lever for acting on said first transmitting means to transmit different rate codes on said first carrier frequency over said communication channel in accordance with the different positions of said control lever, decoding means at said remote signal location controlled by the reception of said first carrier frequency by said first receiving means to control said signal to indicate clear or stop, a second transmitting means at said remote signal location and a second receiving means at said control office interconnected by a communication channel for a second carrier frequency different from said first carrier frequency, circuit means at said remote signal location controlled in accordance with the conditions of said signal and the rate of the code then being received by said first carrier frequency receiving means for causing said second code transmitting means to transmit on said second carrier frequency a code of the same rate then being received when said signal has properly responded to that code then being received, means at the control office governed by said second receiving means for giving a distinctive indication when the code rate received on said second carrier frequency corresponds identically with the code rate being transmitted by said first transmitting means.

10. In a remote control office, a manual block signal remote from a control office, a first transmitting means at the control office and a first receiving means at said remote signal location interconnected by a communication channel for a first carrier frequency, means at the control office including a control lever for acting on said first transmitting means to transmit different code rates on said first carrier frequency over said communication channel in accordance with the different positions of said control lever, decoding means at said remote signal location controlled by said first receiving means to control said signal to indicate clear or stop, a second transmitting means at said remote signal location and a second receiving means at said control office interconnected by a communication channel for a second carrier frequency different from said first carrier frequency, circuit means at said remote signal location including code following means being operated respectively in accordance with the code pulses received from said first receiving means and controlled in accordance with the conditions of said signal for causing said second code transmitting means to transmit a code of the same rate then being received when said signal has properly responded to the code then being received, and correspondence checking circuit means at the control office governed by said second receiving means for giving a distinctive indication when the code rate received corresponds identically with the code rate being transmitted by said first transmitting means and a predetermined phase relationship exists between the code pulses transmitted by said first transmitting means and the code pulses received by said second receiving means.

References Cited in the file of this patent

UNITED STATES PATENTS

| | | |
|---|---|---|
| 2,067,147 | Preston | Jan. 5, 1937 |
| 2,132,139 | Wight | Oct. 4, 1938 |
| 2,280,491 | Kemmerer | Apr. 21, 1942 |
| 2,315,887 | Wallace | Apr. 6, 1943 |
| 2,333,963 | Van Horn | Nov. 9, 1943 |
| 2,398,572 | Baughman | Apr. 16, 1946 |
| 2,506,527 | Vaughn | May 2, 1950 |
| 2,515,855 | Bossart et al. | July 18, 1950 |
| 2,554,000 | Baughman | May 22, 1951 |
| 2,584,739 | Rees et al. | Feb. 5, 1952 |
| 2,604,544 | Dillon et al. | July 22, 1952 |
| 2,607,000 | Mayle | Aug. 12, 1952 |
| 2,611,075 | Marlowe | Sept. 16, 1952 |
| 2,794,117 | Rees et al. | May 28, 1957 |